(12) United States Patent
Advani

(10) Patent No.: US 10,933,209 B2
(45) Date of Patent: Mar. 2, 2021

(54) SYSTEM TO PROCESS DATA RELATED TO USER INTERACTIONS WITH AND USER FEEDBACK OF A PRODUCT WHILE USER FINDS, PERCEIVES, OR USES THE PRODUCT

(71) Applicant: Georama, Inc., Chicago, IL (US)

(72) Inventor: Nihal Advani, Chicago, IL (US)

(73) Assignee: Georama, Inc., Chicago, IL (US)

( * ) Notice: Subject to any disclaimer, the term of this patent is extended or adjusted under 35 U.S.C. 154(b) by 880 days.

(21) Appl. No.: 14/530,441

(22) Filed: Oct. 31, 2014

(65) Prior Publication Data

US 2015/0127486 A1    May 7, 2015

Related U.S. Application Data

(60) Provisional application No. 61/898,478, filed on Nov. 1, 2013.

(51) Int. Cl.
*G06Q 30/00* (2012.01)
*A61M 16/06* (2006.01)
(Continued)

(52) U.S. Cl.
CPC .... *A61M 16/0616* (2014.02); *A61M 16/0683* (2013.01); *A61M 16/1045* (2013.01);
(Continued)

(58) Field of Classification Search
CPC .......... G06Q 30/0241; G06Q 30/0601; G06Q 30/0613; G06Q 30/0623; G06Q 50/14; H04L 65/4069; H04L 65/4084
(Continued)

(56) References Cited

U.S. PATENT DOCUMENTS 5,649,105 A  *  7/1997  Aldred ................... G06F 9/546
                                                            709/204
2001/0044751 A1*  11/2001  Pugliese, III ...... G06Q 30/0643
                                                            705/14.1
(Continued)

FOREIGN PATENT DOCUMENTS

KR    10-2010-0104612    9/2010

OTHER PUBLICATIONS

Using Video to Re-Present the User. Communciations of the ACM, vol. 38, Issue 5, May 1995. pp. 61-71. (Year: 1995).*
(Continued)

*Primary Examiner* — Abby J Flynn
(74) *Attorney, Agent, or Firm* — Fish & Richardson P.C.

(57) ABSTRACT

The embodiments herein provide an internet-based virtual travel system and method that allows people (viewers or virtual travelers) to explore any destination or location in real-time without having to be physically present at those destinations or locations by means of other people (serving as guides or virtual travel guides) who are physically present at the destinations or locations and use one or more mobile devices and/or wearable devices and/or accessories to stream real-time video. The internet-based virtual travel system enables viewers or virtual travelers to find and hire guides or virtual travel guides, virtually explore any destination or location anywhere in the world in real-time via guides or virtual travel guides, receive personalized recommendations regarding virtual exploration (virtual travel) options, make payments for virtual exploration (virtual travel) sessions, visualize virtual exploration (virtual travel) sessions on an interactive map or other forms of visualization, view promotions or product placements incorporated by guides or virtual travel guides during virtual exploration (virtual travel) sessions, engage in real-time virtual shopping via guides or virtual travel guides, and make bookings for physical trips after virtual exploration (virtual travel) sessions.

18 Claims, 8 Drawing Sheets

(51) Int. Cl.
    *G06Q 50/14*     (2012.01)
    *G06Q 30/06*     (2012.01)
    *G06Q 30/02*     (2012.01)
    *H04L 29/06*     (2006.01)
    *A61M 16/10*     (2006.01)

(52) U.S. Cl.
    CPC ..... *G06Q 30/0241* (2013.01); *G06Q 30/0601* (2013.01); *G06Q 30/0613* (2013.01); *G06Q 30/0623* (2013.01); *G06Q 50/14* (2013.01); *H04L 65/4069* (2013.01); *H04L 65/4084* (2013.01)

(58) Field of Classification Search
    USPC ...................................................... 705/26.41
    See application file for complete search history.

(56) References Cited

U.S. PATENT DOCUMENTS

| | | | |
|---|---|---|---|
| 2002/0101510 A1* | 8/2002 | Basson | H04N 7/18 348/169 |
| 2004/0138901 A1 | 7/2004 | Krieger | |
| 2004/0212778 A1* | 10/2004 | Velazquez | G02C 11/10 351/158 |
| 2005/0038326 A1* | 2/2005 | Mathur | A61B 5/411 600/300 |
| 2005/0267826 A1* | 12/2005 | Levy | B25J 9/1689 705/34 |
| 2007/0005795 A1* | 1/2007 | Gonzalez | G11B 27/10 709/232 |
| 2007/0043608 A1* | 2/2007 | May | G06Q 10/0633 705/7.27 |
| 2007/0182595 A1* | 8/2007 | Ghasabian | G06F 1/1632 341/22 |
| 2007/0203741 A1* | 8/2007 | Ordille | G06Q 10/00 705/1.1 |
| 2007/0239867 A1* | 10/2007 | Belimpasakis | H04L 67/303 709/224 |
| 2008/0086386 A1* | 4/2008 | Bell | G06Q 30/06 705/7.35 |
| 2008/0144156 A1* | 6/2008 | Goodman | G02B 23/08 359/226.1 |
| 2008/0173681 A1 | 7/2008 | Robinson | |
| 2008/0319773 A1 | 12/2008 | Wong et al. | |
| 2009/0052450 A1* | 2/2009 | Mockett | H04L 1/1809 370/390 |
| 2009/0067814 A1* | 3/2009 | Douzono | G11B 27/034 386/328 |
| 2009/0113053 A1* | 4/2009 | Van Wie | H04L 12/1827 709/226 |
| 2009/0178096 A1* | 7/2009 | Menn | H04L 1/08 725/114 |
| 2009/0319845 A1* | 12/2009 | Liu | H03M 13/3761 714/747 |
| 2010/0054724 A1* | 3/2010 | Chamberlayne | A45F 3/14 396/423 |
| 2010/0161831 A1* | 6/2010 | Haas | G06F 15/173 709/235 |
| 2011/0288893 A1* | 11/2011 | Francis | G06Q 10/02 705/5 |
| 2012/0102409 A1* | 4/2012 | Fan | H04W 4/00 715/738 |
| 2012/0303488 A1* | 11/2012 | Barron | G06Q 10/08 705/27.1 |
| 2012/0307086 A1* | 12/2012 | Jefremov | H04N 5/23264 348/208.4 |
| 2014/0046829 A1 | 2/2014 | Serban | |
| 2014/0149160 A1* | 5/2014 | Argue | G06Q 10/0631 705/7.13 |
| 2014/0213304 A1* | 7/2014 | Beckett | H04W 4/021 455/456.6 |
| 2014/0267539 A1* | 9/2014 | McBrian | H04N 5/2251 348/14.01 |
| 2014/0279426 A1* | 9/2014 | Holman | G06Q 40/00 705/39 |
| 2015/0058450 A1* | 2/2015 | Hahm | H04L 65/4084 709/219 |

OTHER PUBLICATIONS

Kessler, Sarah. "6 New Apps for Uncovering the Best Local Knowledge") discloses apps for interacting with users ata location of interest Masahble. May 29, 2011 ,https://mashable.com/2011/03/29/local-questions-apps/. (Year: 2011).*

Lloyd, Craig. "Google Field Trip app acts as a virtual tour guide." Slashgear. Sep. 27, 2012. ,https://www.slashgear.com/google-field-trip-app-acts-as-a-virtual-tour-guide-27249527/. (Year: 2012).*

Horsey, Julian. "MiVeu iPhone Case Transforms Your Smartphone Into a Rugged POV Camera." Geeky-Gadgets.com. Jan. 16, 2012 <https://www.geeky-gadgets.com/miveu-iphone-case-transforms-your-smartphone-into-a-rugged-pov-camera-video-16-01-2012/> (Year: 2012).*

Norman H. Mackworth and Edward Llewellyn Thomas, "Head-Mounted Eye-Marker Camera," J. Opt. Soc. Am. 52, 713-716 (1962) (Year: 1962).*

Lauren Crabbe, "Chest mount for photographers who are extremely attached to their smartphones," Digital Photography REview, Jan. 11, 2013 <https://www.dpreview.com/news/9075659864/chest-mount-attached-smartphone> (Year: 2013).*

PCT International Search Report and Written Opinion in International Appln. No. PCT/US2015/057846, dated Feb. 11, 2016, 12 pages.

* cited by examiner

SYSTEM TO PROCESS DATA RELATED TO USER INTERACTIONS WITH AND USER FEEDBACK OF A PRODUCT WHILE USER FINDS, PERCEIVES, OR USES THE PRODUCT

BACKGROUND

Field of the Invention

The embodiments herein generally relate to travel and tourism, and, more particularly to internet-based virtual exploration (virtual travel) that allows people to explore any destination or location without having to be physically present at those destinations or locations.

Description of the Related Art

Travel and tourism is a very popular global activity. Although traveling typically involves physically exploring destinations, virtual exploration options are also available. These virtual exploration options involve viewing or exploring destinations or locations by means of images and videos, and in recent year(s) digital simulations and three-dimensional virtual tours. The drawbacks of these virtual exploration options are that they are not real-time and therefore not always up-to-date, plus they involve interaction between humans and computers and hence lack the interpersonal benefits of interactions between humans. There is some presence of web cameras in the travel context, but in these instances the cameras are typically static or have limited mobility thereby offering a restricted range of view and limited exploration options, plus they too involve interaction between humans and computers and hence lack the interpersonal benefits of interactions between humans. Furthermore, the current virtual travel exploration options are not personalized thereby providing the same content to all users regardless of their unique characteristics, interests, and preferences.

SUMMARY

In view of the foregoing, the embodiments herein provide an internet-based virtual travel system and method that allows people (viewers or virtual travelers) to explore any destination or location in real-time without having to be physically present at those destinations or locations by means of other people (serving as guides or virtual travel guides) who are physically present at the destinations or locations and use one or more mobile devices and/or wearable devices and/or accessories to stream real-time video. The internet-based virtual travel system enables viewers or virtual travelers to find and hire guides or virtual travel guides, virtually explore any destination or location anywhere in the world in real-time via guides or virtual travel guides, receive personalized recommendations regarding virtual exploration (virtual travel) options, make payments for virtual exploration (virtual travel) sessions, visualize virtual exploration (virtual travel) sessions on an interactive map or other forms of visualization, view promotions or product placements incorporated by guides or virtual travel guides during virtual exploration (virtual travel) sessions, engage in real-time virtual shopping via guides or virtual travel guides, and make bookings for physical trips after virtual exploration (virtual travel) sessions, according to embodiments herein.

One embodiments of the present invention is an Internet based virtual travel system, comprising a communicator device for a virtual traveler including a graphical user interface; an audio and a communication circuitry connected to the Internet through a first network; a video device for a virtual travel guide including a camera, an audio and a communication circuitry connected to the Internet through a second network; and an Internet based virtual travel circuitry connecting the communicator device to the video device through the first and second networks, respectively, including a virtual travel server, a database and various interactive modules for communicating a streaming live or a prerecorded video with an audio or a text component between the virtual traveler and the virtual guide for seeing and experiencing destinations or locations worldwide of interest to the virtual traveler.

A further embodiment of the present invention is a method of virtual travel, comprising: accessing an Internet based virtual travel circuitry via a first network connected to the Internet through a communicator device; providing streaming live or prerecorded information about characteristics, interests and preferences of sightseeing destinations and locations in real time or stored in a database of the Internet base virtual travel circuitry, respectively; and streaming live or storing prerecorded video captured by a video device operated by a virtual travel guide and connected to the Internet based virtual circuitry through a second network for seeing and experiencing the destinations and locations worldwide of interest to a viewer without leaving a current location of the viewer.

An Internet based virtual travel system, comprising: a communicator device for a virtual traveler including a graphical user interface, an audio and a communication circuitry connected to the Internet through a first network; a video device for a virtual traveler guide including a camera, an audio and a communication circuitry connected to the Internet through a second network; an Internet based virtual travel circuitry connecting the communicator device to the video device through the first and second networks, respectively, including a virtual travel server, a database and various interactive modules for communicating a streaming live or a prerecorded video with an audio or a text component between the virtual traveler and the virtual traveler guide for seeing and experiencing destinations or locations worldwide of interest to the virtual traveler; and a mounting kit having adjustable members for horizontally mounting the video device wherein the camera is facing downwardly toward the ground for focusing the camera on a prism within the mounting kit that is in-line with the camera lens of the video device to provide a forward looking view from the virtual traveler guide perspective so that the virtual traveler sees and experiences what the virtual traveler guide sees and experiences while at the destinations and locations of interest to the virtual traveler.

These and other aspects of the embodiments herein will be better appreciated and understood when considered in conjunction with the following descriptions and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
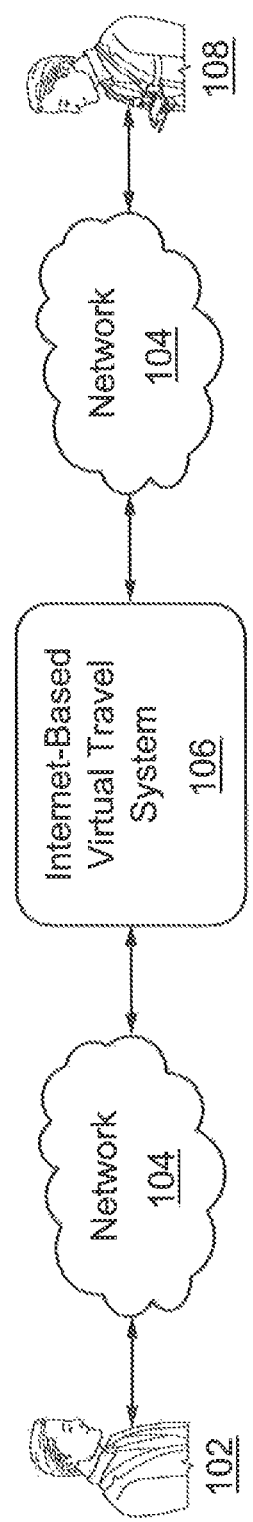
FIG. 1 illustrates a virtual traveler communicating with a virtual travel guide via an internet-based virtual travel system in real-time according to present invention.
Figure 2:
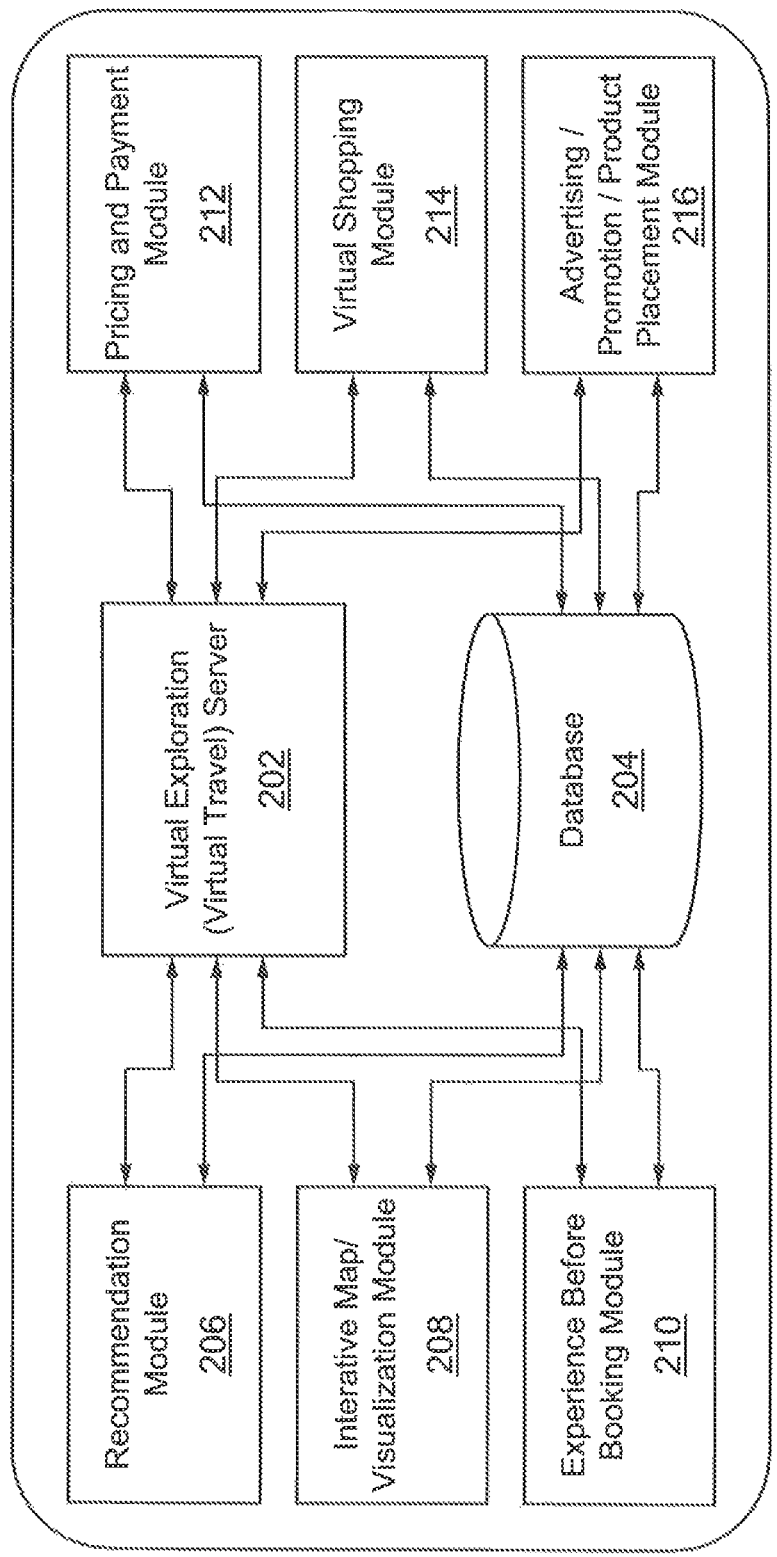
FIG. 2 illustrates an exploded view of the internet-based virtual travel system of FIG. 1.
Figure 3:
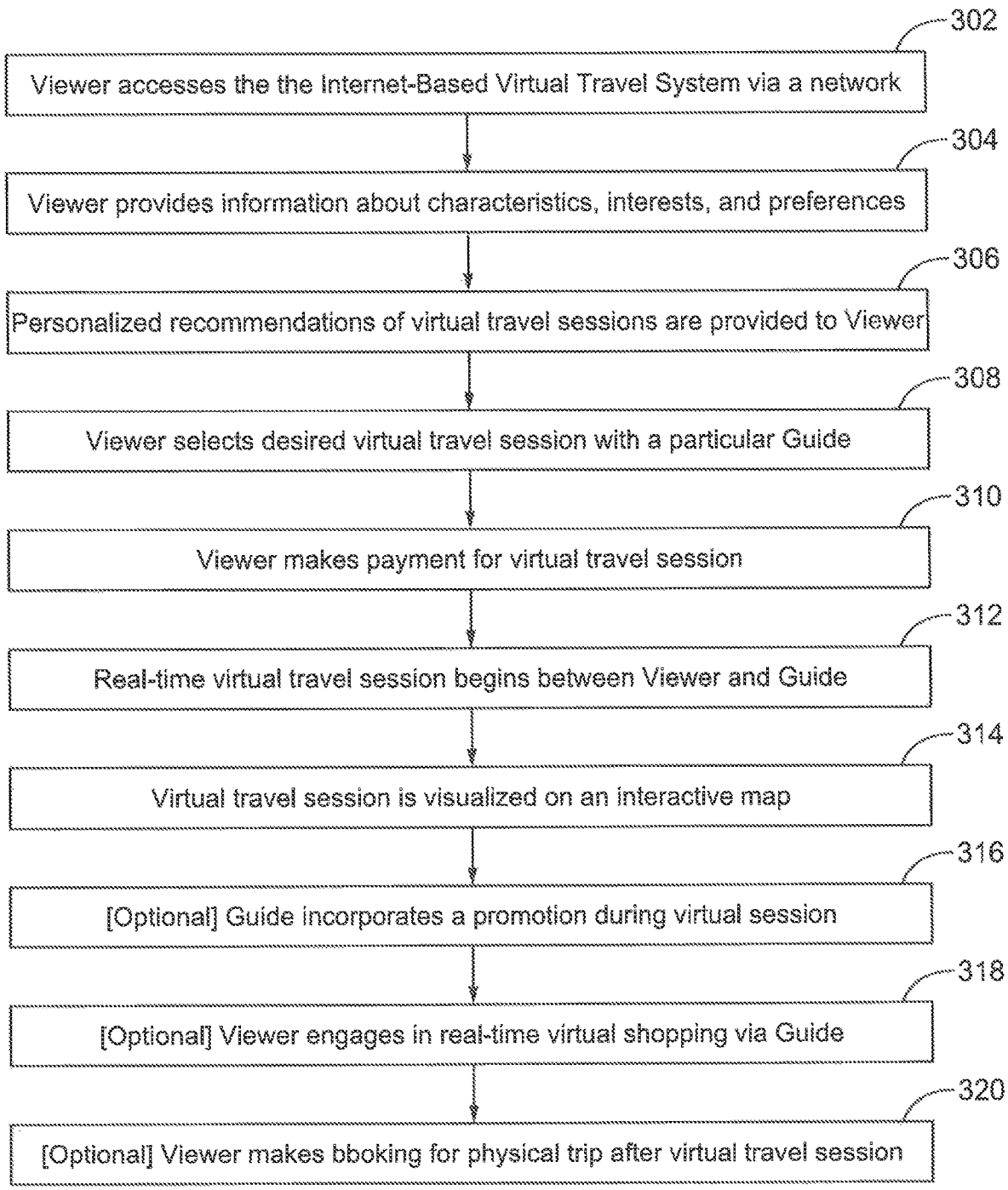
FIG. 3 is a flow diagram illustrating a method for enabling the Internet-based virtual travel system of FIG. 1.

As mentioned, there is a need for real-time virtual exploration (virtual travel) that provides an up-to-date experience of a destination or location, facilitates human to human interaction, offers unlimited mobility and exploration options, and delivers personalized content to users. The embodiments herein achieve this by providing an internet-based virtual travel system and method that allows people (viewers or virtual travelers) to explore any destination or location in real-time without having to be physically present at those destinations or locations by means of other people (serving as guides or virtual travel guides) who are physically present at the destinations or locations and use one or more mobile devices and/or wearable devices and/or accessories to stream real-time video. Referring now to the drawings and more particularly to FIG. 1 through FIG. 3, where similar reference characters denote corresponding features consistently throughout the figures, there are shown preferred embodiments.

FIG. 1 illustrates a user, more specifically a viewer (or virtual traveler) 102 communicating with another user, more specifically a guide (or virtual travel guide) 108 each over a network 104 via an internet-based virtual travel system 106 enabling the viewer (or virtual traveler) 102 to virtually explore any destination or location in real-time without having to be physically present at those destinations or locations according to an embodiment herein.

The Internet-based virtual travel system 106 is accessible by any viewers or virtual travelers 102 and any guides or virtual travel guides 108 using any computer, tablet, mobile device, television, entertainment device, internet connected display, or other internet connected device that is able to deliver audiovisual content. The network 104 used by either viewers or virtual travelers 102 or guides or virtual travel guides 108 to connect to the internet-based virtual travel system 106 may be the internet, a cellular network, and/or other types of networks accessed in a wireless and/or wired manner.

The internet-based virtual travel system 106 provides a person-to-person platform and marketplace that enables viewers or virtual travelers 102 to search, find, view, connect with, learn about, communicate with (via messages, chats, calls, video calls, social media network messages, and/or other methods of communication), preview, review, compare, and hire guides or virtual travel guides 108 to facilitate real-time virtual exploration of any destination or location anywhere in the world or outer space where humans can travel to. Destinations or locations may include but are not limited to islands, safaris, forests, mountains, zoos, parks, amusement parks, museums, villas, resorts, hotels, casinos, restaurants, bars, nightclubs, attractions, landmarks, shopping malls, bazaars, cities, neighborhoods, streets, towns, villages, festivals, events, beaches, oceans, lakes, rivers, other points of interest, and more. The guides or virtual travel guides 108 may provide tours while standing, sitting, walking, running, cycling, playing sports, participating in water sports, participating in adventure sports, participating in winter sports, or performing any other activity, or while traveling in a car, bus, train, flight, cruise, or using any other mode of transport.

The internet-based virtual travel system 106 by default facilitates real-time virtual exploration (virtual travel) sessions between a viewer or virtual traveler 102 or a group of viewers or virtual travelers 102 in one location and a guide or virtual travel guide 108 in another location, where the viewers or virtual travelers 102 can provide instructions to the guide or virtual travel guide 108 during the session in regards to what they would like to see, where they would like the guide or virtual travel guide 108 to go, what they would like the guide or virtual travel guide 108 to do, and more besides getting information, recommendations, and more from the guide or virtual travel guide 108. This communication between the viewers or virtual travelers 102 and guides or virtual travel guides 108 may take place via voice/audio call, text based messages, one-way audio call and one-way video call, two-way video call, text to audio messages, and/or other forms of communication between the viewer's or virtual traveler's 102 internet connected device and the guide's or virtual travel guide's 108 mobile device and/or wearable device and/or accessories. The internet-based virtual travel system 106 can also facilitate virtual exploration (virtual travel) sessions between multiple viewers or virtual travelers 102 or multiple groups of viewers or virtual travelers 102 in multiple locations and one or more guides or virtual travel guides 108 in another location or multiple locations. The communication (including but not limited to instructions and requests from one or more viewers or virtual travelers 102 and responses, information, and recommendations from one or more guides or virtual travel guides 108) in this scenario between the viewers or virtual travelers 102 and the guides or virtual travel guides 108 may take place via voice/audio call, text based messages, one-way audio call and one-way video call, two-way video call, social media network messages, text to audio messages, and/or other forms of communication between the viewers' or virtual travelers' 102 internet connected devices and the guides' or virtual travel guides' 108 mobile devices and/or wearable devices and/or accessories.

FIG. 2 illustrates an exploded view of the internet-based virtual travel system 106 of FIG. 1 according to an embodiment herein. The internet-based virtual travel system 106 includes a virtual exploration (virtual travel) server 202, a database 204, a recommendation module 206, an interactive map/visualization module 208, an experience before booking module 210, a pricing and payment module 212, a virtual shopping module 214, and an advertising/promotion/product placement module 216.

A guide or virtual travel guide 108 may stream video in real-time to a viewer or virtual traveler 102 over a network 104 via the internet-based virtual travel system 106 and more specifically the virtual exploration (virtual travel) server 202 using one or more mobile devices and/or wearable devices and/or accessories. One example of this is when a guide or virtual travel guide 108 uses an application on their mobile phone that utilizes the mobile phone's camera and microphone to capture video and audio and then sends or streams it in real-time over the internet to the viewer or virtual traveler 102. Another example is when a guide or virtual travel guide 108 has a wearable device, for example a hat which contains an internet connected camera that is able to capture and stream video in-real time to a viewer or virtual traveler 102. One more example is when a guide or virtual travel guide 108 has an accessory, for example a backpack, which contains equipment that helps provide a stronger network connection in order to facilitate more stable and/or faster streaming of video when using a mobile phone camera or a wearable hat camera to capture and stream video.

The virtual exploration (virtual travel) server 202 enables a viewer or virtual traveler 102 to instantly hire a guide or virtual travel guide 108 for a real-time virtual exploration (virtual travel) session. In addition, the virtual exploration (virtual travel) server 202 offers the ability for a viewer or virtual traveler 102 to schedule a real-time virtual exploration (virtual travel) session with a guide or virtual travel guide 108 for a later date and/or time. The virtual exploration (virtual travel) server 202 also provides the ability for a viewer or virtual traveler 102 to hire a guide or virtual travel guide 108 to record a virtual exploration (virtual travel) session at a particular date and/or time that would be made available for the viewer or virtual traveler 102 to watch at their convenience.

The recommendation module 206 provides personalized suggestions of relevant virtual exploration (virtual travel) options (content and/or sessions and/or guides or virtual travel guides 108) to each viewer or virtual traveler 102 or each group of viewers or virtual travelers 102 via a recommendation engine that considers their (a) characteristics such as age, gender, relation to each other (in case of a group), and/or or other physical or mental characteristics; and/or (b) interests in general or for the upcoming virtual exploration (virtual travel) session including but not limited to experience based interests such as adventure, luxury, culture, history, romantic, culinary, beach, nightlife, leisure, and other experiences, and/or activity based interests such as camping, fishing, hiking, skydiving, surfing, kayaking, scuba diving, sightseeing, shopping, skiing, and other activities, and/or event based interests such as concerts, sporting events, carnivals, parades, festivals, and other events, and/or location based interests such as islands, safaris, forests, mountains, zoos, parks, amusement parks, museums, villas, resorts, hotels, casinos, restaurants, bars, nightclubs, attractions, landmarks, shopping malls, bazaars, cities, neighborhoods, streets, towns, villages, beaches, oceans, lakes, rivers, and other locations; and/or (c) preferences in general or for the upcoming virtual exploration (virtual travel) session including but not limited to duration, date, time of day, weather, regional preferences (continent, region, country, state, and/or city), language, budget, mode of transport, location quality and/or rating, video quality, guide or virtual travel guide 108 rating and/or reviews, guide or virtual travel guide 108 physical and/or mental characteristics, and other preferences. These viewer or virtual traveler 102 characteristics, interests, and preferences (and their prioritization, if any) may be explicitly provided by the viewers or virtual travelers 102 and/or inferred by the recommendation module 206 using its own data and/or third party data. The recommendation module 206 computes personalized suggestions for viewers or virtual travelers 102 using algorithms that consider the viewer or virtual traveler 102 characteristics, interests, and preferences (and their prioritization, if any) as well as content in the database 204 (including proprietary content, guide or virtual travel guide 108 data, third party data, and other types of data) as well as any external or third party data and other factors, thereby surfacing up the most relevant suggestions in ranked order. Instead of or in addition to receiving recommendations, viewers or virtual travelers 102 may search the database 204 for relevant content and/or virtual exploration (virtual travel) sessions and they also have the ability to select an option in which the virtual exploration (virtual travel) server 202 will show virtual exploration (virtual travel) sessions at random, surprising the viewer or virtual traveler 102.

In addition to providing a real-time video stream during a virtual exploration (virtual travel) session, the internet-based virtual travel system 106 has an interactive map/visualization module 208 that can provide a real-time interactive map which plots the current and past movements of a guide or virtual travel guide 108 using GPS data transmitted by one or more mobile devices and/or wearable devices and/or accessories in the possession of a guide or virtual travel guide 108. This interactive map may be made available for a particular real-time virtual exploration (virtual travel) session by a particular guide or virtual travel guide 108, all real-time virtual exploration (virtual travel) sessions by all guides or virtual travel guides 108 at a point in time, all past virtual exploration (virtual travel) sessions by a particular guide or virtual travel guide 108, all past virtual exploration (virtual travel) sessions by all guides or virtual travel guides 108, all past virtual exploration (virtual travel) sessions by a particular viewer or virtual traveler 102, all past virtual exploration (virtual travel) sessions by all viewers or virtual travelers 102; all real-time and/or past and/or planned virtual exploration (virtual travel) sessions by groups of viewers or virtual travelers 102 and/or guides or virtual travel guides 108 grouped based on region/s, language/s, characteristic/s, interest/s, preference/s, popularity, types of locations, types of activities, types of transport, types of technology used, etc.; and other scenarios. A three-dimensional interactive globe or other forms of visualization may also be used to visualize this data in addition to or instead of a two-dimensional interactive map.

For those viewers or virtual travelers 102 who use the internet-based virtual travel system 106 for the purpose of virtually exploring one or more destinations, locations, and/or activities prior to physically making a trip to visit those destinations or locations or to perform those activities, the internet-based virtual travel system 106 has an experience before booking module 210 that provides the ability to make various types of bookings including transport (flight, rental car, bus, train, and others), lodging (hotel, hostel, bed & breakfast, and others), activities, and more upon completion of a virtual exploration (virtual travel) session. An example of this is if a viewer or virtual traveler 102 wants to explore a hotel and/or particular hotel room/s before making a purchase they can hire a guide or virtual travel guide 108 (who may or may not be an employee of the particular hotel) to help them see and experience the hotel and/or hotel room/s in order to decide if it meets their requirements. Once the viewer or virtual traveler 102 has decided, they may make a booking to physically stay in that hotel through the booking engine provided by the experience before booking module 210.

The internet-based virtual travel system 106 has a pricing and payment module 212 that enables viewers or virtual travelers 102 to pay for hiring guides or virtual travel guides 108 in multiple ways, including but not limited to paying per view or per virtual exploration (virtual travel) session, paying for a certain length of virtual exploration (virtual travel) session, paying for increasing the length of an ongoing virtual exploration (virtual travel) session, paying for a type of virtual exploration (virtual travel) session, paying for a recorded virtual exploration (virtual travel) session, paying for an experience before booking virtual exploration (virtual) travel session, paying for a package of virtual exploration (virtual travel) sessions, paying for a subscription to the internet-based virtual travel system 106, paying for a subscription to a guide or virtual travel guide 108, paying for an interaction with a guide or virtual travel guide 108 or a set of interactions with one or more guides or virtual travel guides 108, paying for one or more guides or virtual travel guides 108 to perform one or more specific actions and more. The prices of the virtual exploration (virtual travel) sessions may be set by the guides or virtual travel guides 108 and/or the pricing and payment module 212, where there may or may not be minimum threshold amounts for particular kinds and/or particular durations of virtual exploration (virtual travel) sessions.

In the event of a virtual exploration (virtual travel) session between multiple viewers or virtual travelers 102 or multiple groups of viewers or virtual travelers 102 in multiple locations and one or more guides or virtual travel guides 108, the pricing and payment module 212 will provide an option to the guides or virtual travel guides 108 to set a minimum goal amount which must be reached in order for the virtual exploration (virtual travel) session to begin. In such a scenario, all the viewers or virtual travelers 102 or groups of viewers or virtual travelers 102 would have the ability to contribute payments towards this goal and there may or may not be minimum contribution thresholds. When the goal is reached the virtual exploration (virtual travel) server 202 would allow the viewers or virtual travelers 102 or groups of viewers or virtual travelers 102 that contributed towards the goal to watch the virtual exploration (virtual travel) session once it begins. Anyone would be allowed to join such an ongoing virtual exploration (virtual travel) session at any time during the session provided that they pay the minimum contribution amount, if any. During such a group virtual exploration (virtual travel) session or any kind of virtual exploration (virtual travel) session, the pricing and payment module 212 will provide viewers or virtual travelers 102 the ability to tip or provide additional rewards to the guides or virtual travel guides 108 for their services. In certain cases the internet-based virtual travel system 106 may allow viewers or virtual travelers 102 to make requests for and/or to bid on (against other viewers or virtual travelers 102) particular kinds of virtual exploration (virtual travel) sessions and/or particular guides or virtual travel guides 108.

The pricing and payment module 212 can distribute payments made by viewers or virtual travelers 102 between the guides or virtual travel guides 108 and the internet-based virtual travel system 106 based on the amount of commission that the internet-based virtual travel system 106 would receive to facilitate the service. In addition to paying for hiring guides or virtual travel guides 108, viewers or virtual travelers 102 will also be able to pay for various types of physical travel bookings as well as various forms of memorabilia related to the internet-based virtual travel system 106, their virtual exploration (virtual travel) sessions, and more. The pricing and payment module 212 may allow payments made by viewers or virtual travelers 102 to be processed immediately, scheduled to be processed at a certain date or time, processed upon a certain event, processed at a recurring frequency, held in escrow and processed only after receiving the goods or services they paid for, and/or held in escrow and processed only after receiving satisfactory goods or services. The pricing and payment module 212 may accept payments via cash, credit cards, bank transfers, intermediaries, payment systems, mobile payments, email payments, virtual currencies, and other forms of payment.

The internet-based virtual travel system 106 has a virtual shopping module 214 that allows viewers or virtual travelers 102 to engage in real-time virtual shopping wherein the viewers or virtual travelers 102 could virtually explore shopping malls, markets, bazaars, fairs, shops, and more in other locations in real-time via guides or virtual travel guides 108 who will be physically present at those locations and assist the viewers or virtual travelers 102 to view, compare, choose, negotiate, and purchase various kinds of goods or products. In such a virtual shopping scenario the payment for goods or products may be made directly or remotely by the viewers or virtual travelers 102 and/or in-person by the guides or virtual travel guides 108 on behalf of the viewers or virtual travelers 102 using their own money and/or money transferred to them by the viewers or virtual travelers 102 and/or the internet-based virtual travel system 106 whether it be transferred to their bank account, a debit or credit card, or by using some other method of money or virtual currency transfer. Upon purchase, the guides or virtual travel guides 108 would ship the goods or products to the addresses specified by the viewers or virtual travelers 102. In the event that guides or virtual travel guides 108 use their own money to purchase goods or products on behalf of viewers or virtual travelers 102, the viewers or virtual travelers 102 would pay back the guides or virtual travel guides 108 via the internet-based virtual travel system 106 and more specifically the pricing and payment module 212 by instantly transferring them the money owed, making the payment at a specified date or time, placing money in escrow which would be released to the guides or virtual travel guides 108 upon the viewers or virtual travelers 102 receiving the goods or products they asked for, and/or using other methods of payment or reimbursement. In such a virtual shopping scenario, the pricing and payment module 212 may enable or require viewers or virtual travelers 102 to pay a service fee or commission to the guides or virtual travel guides 108 and/or the internet-based virtual travel system 106 for facilitating the purchase of goods or products.

The internet-based virtual travel system 106 has an advertising/promotion/product placement module 216 that can facilitate various forms of advertising, promotions, and product placements. In addition to the ability to host image, text, interactive and other types of ads (advertisements) on the internet-based virtual travel system's 106 website, the advertising/promotion/product placement module 216 also has the ability to incorporate video ads before, during, and/or after streaming or playing the virtual exploration (virtual travel) sessions. Furthermore, the advertising/promotion/product placement module 216 has the ability to incorporate promotions or product placements in a video during a virtual exploration (virtual travel) session. Examples of these promotions or product placements include but are not limited to featuring a particular restaurant during a virtual exploration (virtual travel) session or mentioning or showing a certain store during a virtual exploration (virtual travel) session. Such promotions or product placements may be introduced by the guides or virtual travel guides 108 during a virtual exploration (virtual travel) session based on information that they looked up or received before the virtual exploration (virtual travel) session and/or receive in real-time during the virtual exploration (virtual travel) session from the advertising/promotion/product placement module 216. Such promotions or product placements may also be automatically introduced by the advertising/promotion/product placement module 216 without the help of a guide or virtual travel guide 108 during a virtual exploration (virtual travel) session based on image recognition technology, GPS technology/data, data/information provided by advertisers, and/or other data collected from the mobile devices and/or wearable devices and/or accessories of the guides or virtual travel guides 108.

To facilitate promotions or product placements the advertising/promotion/product placement module 216 connects advertisers to guides or virtual travel guides 108. Advertisers can use the advertising/promotion/product placement module 216 to identify and select one or more guides or virtual travel guides 108 they would like to run promotions/product placements with and/or destinations or locations they would like to run promotions/product placements in and/or types of activities they would like to run promotions/product placements during and/or modes of transport they would like to run promotions/product placements on and/or other options that they would like to run promotions/product placements for. The advertising/promotion/product placement module 216 also enables advertisers to input or submit relevant content or data for their promotions or product placements including but not limited to text, audio, images, videos, latitudes and longitudes, descriptions, offers, discount codes, metadata, and more. This promotions or product placements related data may be stored in the database 204 for later use and/or used immediately. The guides or virtual travel guides 108 may use the advertising/promotion/product placement module 216 prior to a virtual exploration (virtual travel) session to find and select one or more advertisements that they may be able to incorporate during their upcoming virtual travel sessions. The advertising/promotion/product placement module 216 may also suggest relevant promotions or product placements to guides or virtual travel guides 108 during a virtual exploration (virtual travel) session based on where they are and/or what they are doing and/or more. These suggestions may be sent by the advertising/promotion/product placement module 216 to the guides or virtual travel guides 108 via their mobile devices and/or wearable devices and/or accessories using text messages, audio call, text to audio call, or other methods of communication or notification. In order to select the right promotions or product placements to suggest to guides or virtual travel guides 108 during a virtual exploration (virtual travel) session or to automatically introduce/show during a virtual exploration (virtual travel) session the advertising/promotion/product placement module 216 will calculate not only the degree of relevance that a particular promotion or product placement has to a particular virtual exploration (virtual travel) session and/or to a particular point or time within a virtual exploration (virtual travel) session but also the amount that the advertiser is willing to pay for that particular promotion or product placement as well as other factors. Advertisers may be able to pay a fixed price for a particular promotion/product placement or type of promotion/product placement and/or pay a certain price for a group of promotions/product placements and/or pay based on the amount of viewers or virtual travelers 102 watching a particular promotion/product placement and/or bid against other advertisers in real-time for a particular promotion/product placement spot and/or pay using other methods of pricing or bidding.

The database 204 of the internet-based virtual travel system 106 will collect and store vast amounts of data from the usage of the system and its features and other data including but not limited to data on the characteristics, interests, preferences, demographics, psychographics, virtual exploration (virtual travel) sessions, locations, devices, interactions, usage, selections, intent, payments, bookings, advertisements, promotions, product placements, video, audio, communications, transport, activities, movements, and more of viewers or virtual travelers 102 and/or guides or virtual travel guides 108. The database 204 may also collect and store additional data from the mobile devices, wearable devices, and accessories of the guides or virtual travel guides 108 including but not limited to GPS data, audio and video data from the locations or activities, and other location or activity data derived from various sensors. Any of the data collected and/or stored by the database 204 may be analyzed and/or processed in several ways to learn more about the internet-based virtual travel system 106, viewers or virtual travelers 102, guides or virtual travel guides 108, advertisers, destinations, locations, activities, and more. Any of the data collected, stored, analyzed, and/or processed by the database 204 and internet-based virtual travel system 106 may be used not only to improve the internet-based virtual travel system 106 and its features but also to create reports and solutions that inform and/or help the travel industry, airlines, hotels, tour providers, travel agents, online travel agents, tourism boards, locations, activity providers, transportation providers, device manufacturers, technology companies, software providers, solutions providers, volunteer organizations, educational institutions, governmental organizations, and other relevant people and/or entities on matters relating to usage, volume, trends, intent, issues, opportunities, leads, and much more.

FIG. 3, with reference to FIG. 1 and FIG. 2, is a flow diagram illustrating a method for enabling a viewer (or virtual traveler) 102 to: virtually explore any destination or location in real-time via a guide (or virtual travel guide) 108, receive personalized recommendations regarding virtual exploration (virtual travel) sessions, make a payment for a virtual exploration (virtual travel) session, visualize a virtual exploration (virtual travel) session on an interactive map, view a promotion incorporated by a guide (or virtual travel guide) 108 during a virtual exploration (virtual travel) session, engage in real-time virtual shopping via a guide (or virtual travel guide) 108, and make a booking for a physical trip after a virtual exploration (virtual travel) session, using the internet-based virtual travel system 106 of FIG. 1, according to an embodiment herein.

In step 302, a viewer or virtual traveler 102 accesses the internet-based virtual travel system 106 via a network 104. In step 304, the viewer or virtual traveler 102 provides information about one or more of their characteristics, interests, and/or preferences. In step 306, the recommendation module 206 provides personalized suggestions/recommendations of relevant and available virtual exploration (virtual travel) sessions to the viewer or virtual traveler 102 based on their characteristics, interests, and/or preferences. In step 308, the viewer or virtual traveler 102 selects a desired virtual exploration (virtual travel) session with a particular guide or virtual travel guide 108. In step 310, the viewer or virtual traveler 102 makes a payment for the virtual exploration (virtual travel) session via the pricing and payment module 212. In step 312, the virtual exploration (virtual travel) server 202 begins the real-time virtual exploration (virtual travel) session between the viewer or virtual traveler 102 and the guide or virtual travel guide 108, wherein the guide or virtual travel guide 108 uses one or more mobile devices and/or wearable devices and/or accessories to stream video in real-time to the viewer or virtual traveler 102 in order to facilitate real-time virtual exploration (virtual travel). In step 314, the interactive map/visualization module 208 provides the viewer or virtual traveler 102 a real-time interactive map which plots the current and past movements of the guide or virtual travel guide 108 during the virtual exploration (virtual travel) session using GPS data transmitted by one or more mobile devices and/or wearable devices and/or accessories in possession of the guide or virtual travel guide 108. In optional step 316, the guide or virtual travel guide 108 may choose to incorporate a promotion or product placement for the viewer or virtual traveler 102 to view during a virtual exploration (virtual travel) session based on information provided to the guide or virtual travel guide 108 in real-time by the advertising/promotion/product placement module 216. In optional step 318, the viewer or virtual traveler 102 may choose to engage in real-time virtual shopping via the guide or virtual travel guide 108, made available by the virtual shopping module 214. In optional step 320, after the virtual exploration (virtual travel) session, the viewer or virtual traveler 102 may choose to leverage the booking engine offered by the experience before booking module 210 to make a booking for a physical trip to the destinations or locations seen by the viewer or virtual traveler 102 during the virtual exploration (virtual travel) session.

The flow diagram in FIG. 3 demonstrates just one example of a flow in the internet-based virtual travel system 106. The internet-based virtual travel system 106 and its modules have several capabilities and possibilities, some of which are detailed in the detailed description of FIG. 1 and FIG. 2, that can result in several variations of the flow diagram demonstrated in FIG. 3 as well as different flows. Some examples of when variations to this flow would occur include but are not limited to (a) when there are multiple viewers or virtual travelers 102 and/or multiple groups of viewers or virtual travelers 102 instead of one viewer or virtual traveler 102; (b) when the viewer or virtual traveler 102 chooses not to provide information about their characteristics, interests, and preferences and directly selects a virtual exploration (virtual travel) session or when their characteristics, interests, and preferences are inferred by the recommendation module 206; (c) when the viewer or virtual traveler 102 chooses to request a new virtual exploration (virtual travel) session instead of picking one that is already available; (d) when the viewer or virtual traveler 102 decides to join a virtual exploration (virtual travel) session with other viewers or virtual travelers 102 or groups of viewers or virtual travelers 102 in other locations; (e) when the viewer or virtual traveler 102 pays for a virtual exploration (virtual travel) session after the virtual exploration (virtual travel) session is completed rather than before it starts; (f) when the interactive map/visualization module 208 visualizes the virtual exploration (virtual travel) session on an interactive globe or another form of visualization rather than an interactive map; (g) when the advertising/promotion/product placement module 216 automatically introduces a promotion or product placement during the virtual exploration (virtual travel) session without the help of a guide or virtual travel guide 108; and more.

The internet-based virtual travel system 106 provides several benefits and advantages to viewers or virtual travelers 102, including but not limited to (a) the ability to virtually explore any destination or location in the world from the convenience of their home or anywhere they choose without having to be physically present at the destination or location; (b) the ability to virtually explore any destination or location in the world in real-time and therefore always have an up-to-date experience with up-to-date content; (c) the ability to virtually explore any destination or location in a personalized fashion via guides or virtual travel guides 108 who can show viewers or virtual travelers 102 exactly what they want to see and how they want to see it; (d) the ability to virtually explore any destination or location via guides or virtual travel guides 108 and thereby benefit from human to human interaction; (e) the ability to virtually explore any destination or location via guides or virtual travel guides 108 who are completely mobile and can go to any place humans can go, thereby having access to unlimited mobility and exploration options; (f) the ability to get personalized suggestions of virtual exploration (virtual travel) sessions and other content based on their characteristics, interests, and preferences; (g) the ability to engage in real-time virtual shopping via guides or virtual travel guides 108 anywhere in the world without having to be physically present at a shop, mall, bazaar, or other location; (h) the ability to virtually experience any destination or location or activity before booking or making a physical trip; (i) the ability to jointly virtually explore any destination or location with other viewers or virtual travelers 102 in one or more locations and/or multiple groups of viewers or virtual travelers 102 in multiple locations; (j) the ability to virtually explore multiple destinations or locations at the same time via multiple guides or virtual travel guides 108 in multiple locations; (k) the ability to virtually explore any destination or location at any time for any amount of time; (l) the ability to virtually explore any destination or location for a fraction of the cost in comparison to physical exploration/travel; (m) the ability to engage in virtual exploration (virtual travel) much more often than physical exploration (travel) due to its low cost and convenience; and more.

The internet-based virtual travel system 106 can provide value to an extremely large audience, including but not limited to those who want to virtually explore a destination before making a physical trip, those who are unable to afford the cost to make a physical trip, those who want to learn more about the world, those who have a physical limitation that doesn't allow them to make a physical trip or perform certain activities, entities like educational institutions, hospitals, old age homes, and volunteer organizations, those who are looking for a fun and engaging experience, those that want an alternative to watching movies or television shows, those who want to view and/or experience what is happening around the world in real-time, and many others. Furthermore, the internet-based virtual travel system 106 helps people around the world generate income by becoming a guide or virtual travel guide 108. The internet-based virtual travel system 106 also helps improve cultural knowledge and learning around the world by making it so easy to virtually explore any destination or location in real-time via a guide or virtual travel guide 108. And the internet-based virtual travel system 106 also provides access to new innovative forms of advertising wherein advertisers can introduce promotions or product placements in real-time during virtual exploration (virtual travel) sessions going on anywhere in the world through guides or virtual travel guides 108 and/or automatically through the advertising/promotion/product placement module 216.

In addition to being directly available to viewers or virtual travelers 102 via its own websites and/or applications, the internet-based virtual travel system 106 may also be distributed to other websites and/or applications via widgets, HTML iFrames, application programming interfaces, and/or other methods. These distributed versions of the internet-based virtual travel system 106 may or may not be customized, may or may not be distributed for a fee, and may or may not offer affiliate commissions to the other websites and/or applications.

Other features of the internet-based virtual travel system 106 include but are not limited to (a) the ability to enable a viewer or virtual traveler 102 to record a virtual exploration (virtual travel) session and play it back while on a physical trip to that location wherein it plays back the appropriate part of a virtual exploration (virtual travel) session based on the GPS data and/or other data and may show or overlay the virtual exploration (virtual travel) session footage next to or on top of the current view of that location; (b) the ability to enable a viewer or virtual traveler 102 to capture pictures or images from a virtual exploration (virtual travel) session as well as the ability to enable a viewer or virtual traveler 102 to superimpose images of themselves, their group, and/or their friends into the images taken from a virtual exploration (virtual travel) session; (c) the ability to enable a viewer or virtual traveler 102 to invite their friends to a virtual exploration (virtual travel) session, get recommendations from their friends in regards to which virtual exploration (virtual travel) session to choose, and share information about their virtual exploration (virtual travel) session with friends before, during, and after the virtual exploration (virtual travel) session; (d) the ability of the interactive map/visualization module 208 to show or provide information on the locations and other points of interests seen in a virtual exploration (virtual travel) session by means of image recognition, augmented reality, GPS data, and other data and technologies; (e) the ability of the virtual exploration (virtual travel) server 202 to enable travelers to stream real-time video to friends during a physical trip as well as the ability of the interactive map/visualization module 208 to show a real-time interactive map or globe plotting their itinerary or places where the travelers currently are and have been; (f) the ability of the virtual exploration (virtual travel) server 202 to enable travelers to turn on real-time video streaming or sharing while on a physical trip and potentially earn money from viewers or virtual travelers 102 who want to virtually explore those locations; and (g) the ability of the internet-based virtual travel system 106 and the virtual exploration (virtual travel) server 202 to host one more applications that add to and/or further enhance their features and improve the experience for viewers or virtual travelers 102, guides or virtual travel guides 108, and/or advertisers.

Figure 4:
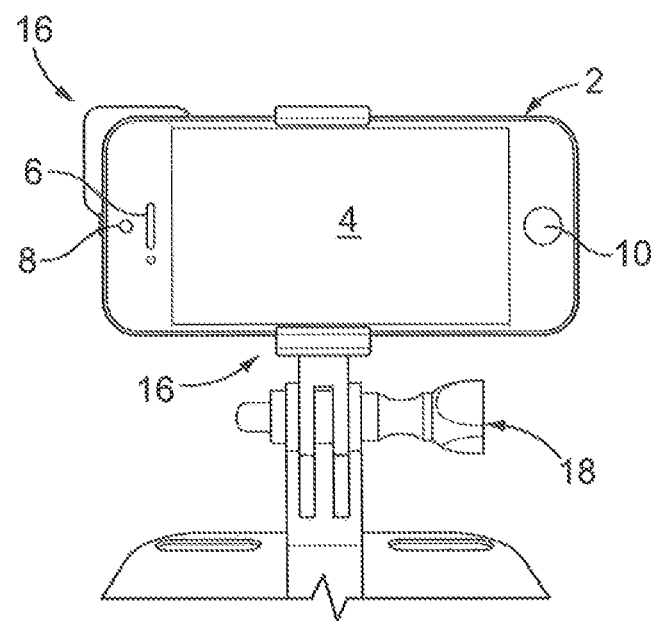
FIG. 4 is an illustration of a video device secured to a mounting kit connected to a partial depiction of a shoulder harness in accordance with the present Internet-based virtual travel system of FIG. 1.
Figure 5:
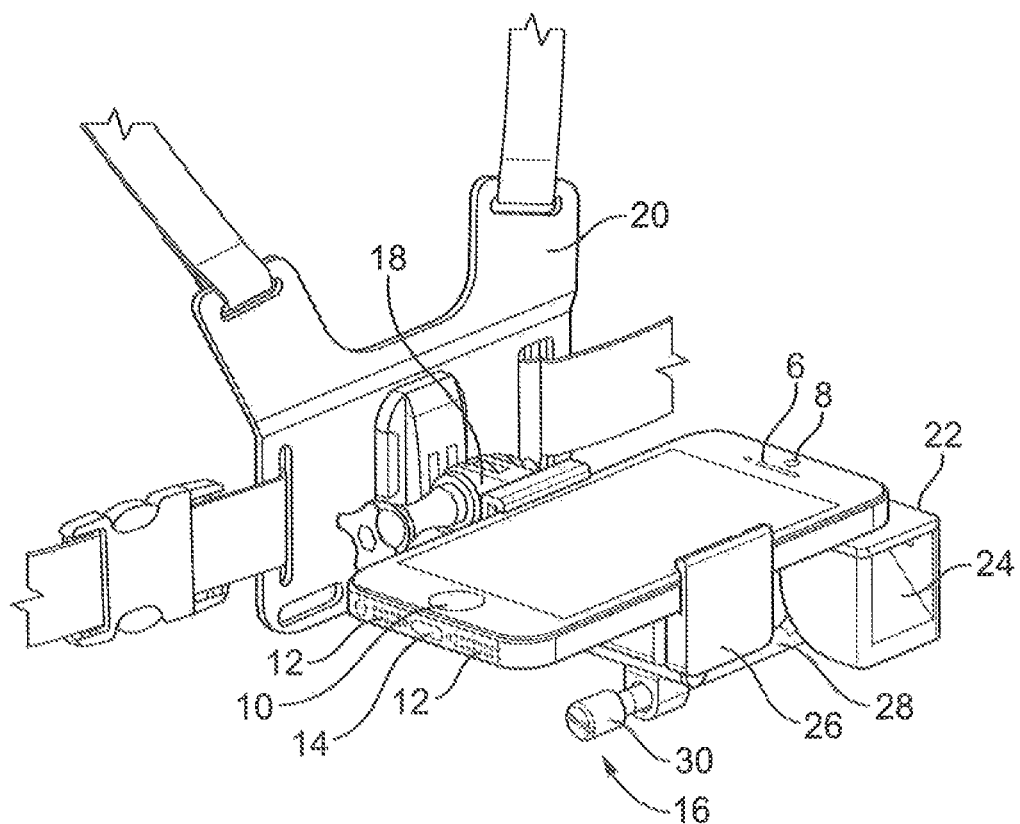
FIG. 5 is a perspective view of a video device secured to a video device mounting kit connected to a shoulder harness in accordance with the present Internet-based virtual travel system of FIG. 1.
Figure 6:
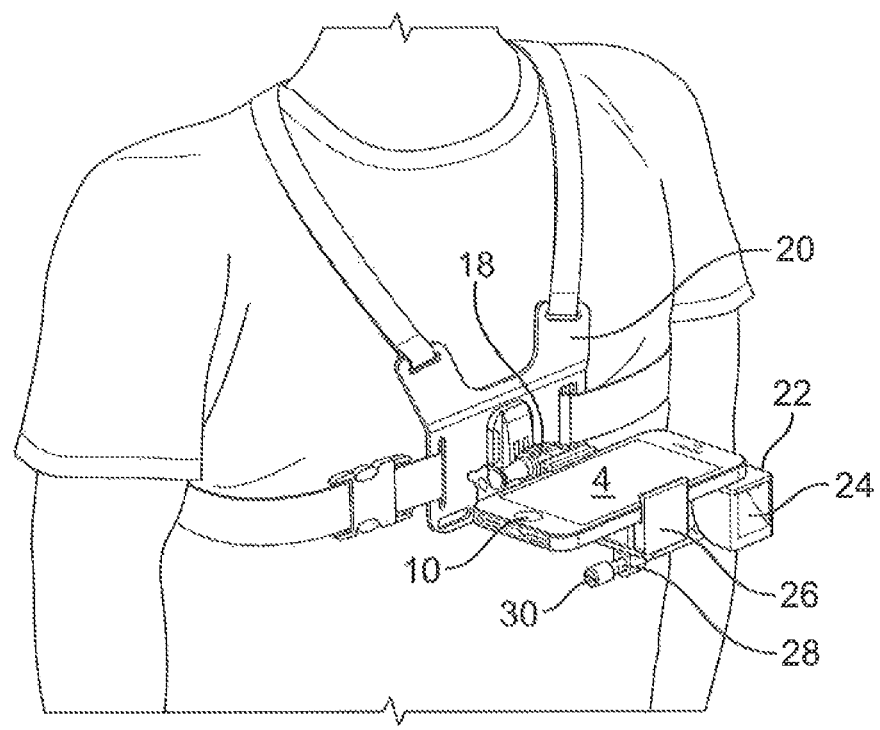
FIG. 6 is a perspective view of a travel guide with a video device secured to a mounting kit connected to a shoulder harness on the chest of the travel guide in accordance with the present Internet-based virtual travel system of FIG. 1.
Figure 7:
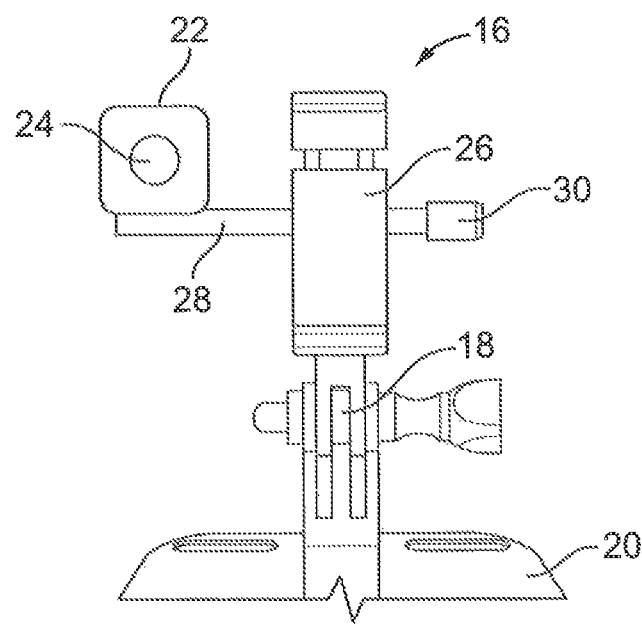
FIG. 7 illustrating a video device mounting kit connection to a shoulder harness in accordance with the present Internet-based virtual travel system of FIG. 1.
Figure 8:
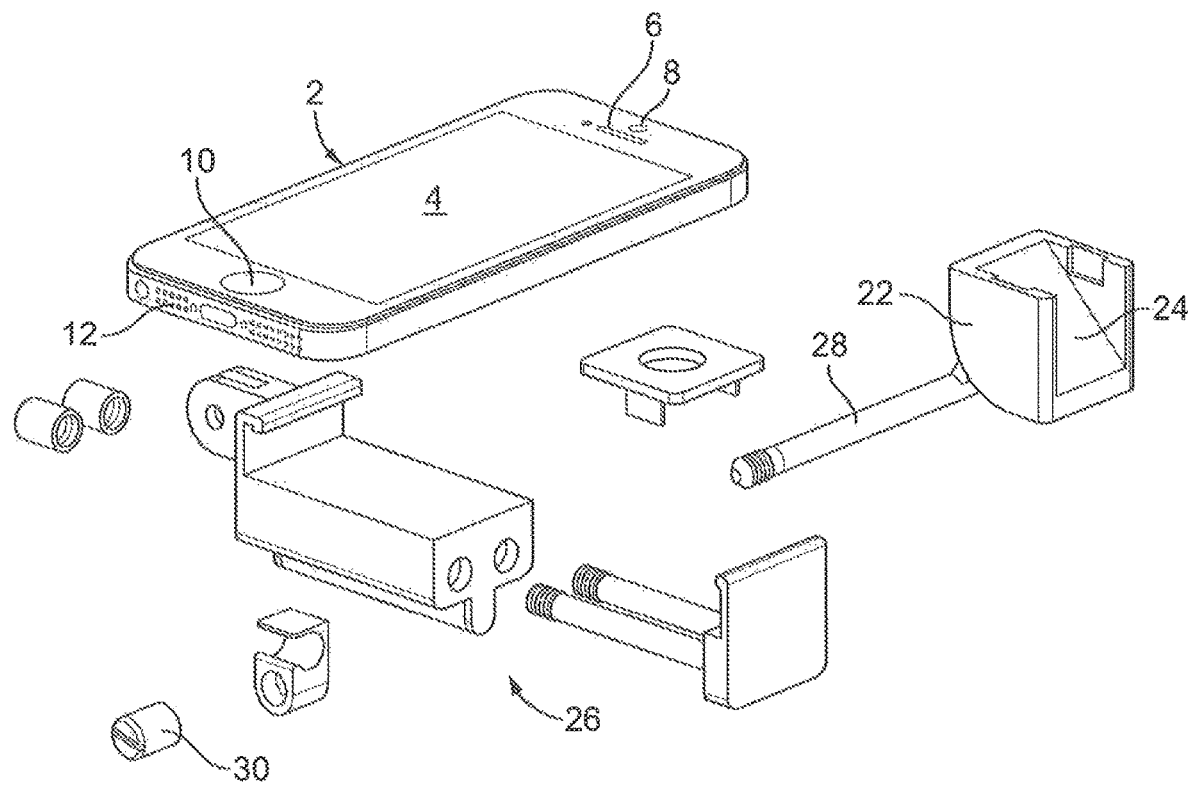
FIG. 8 is an exploded view of a mounting kit for connection to a video device in accordance with the present Internet-based virtual travel system of FIG. 1.
Figure 9:
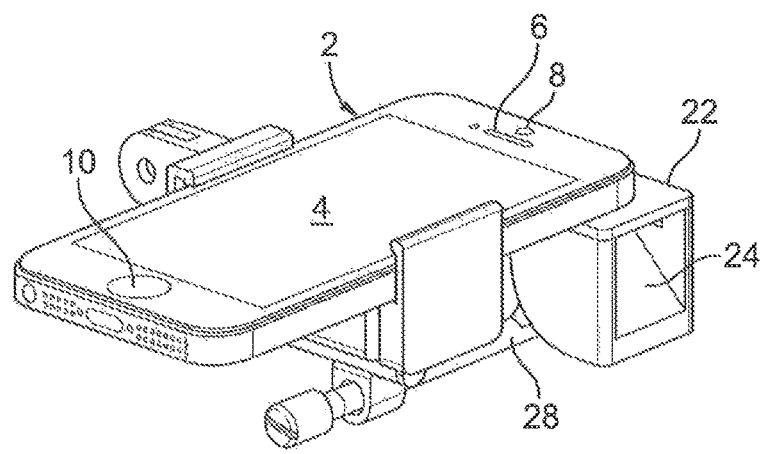
FIG. 9 is a top perspective view of a video device secured to a mounting kit in accordance with the present Internet-based virtual travel system of FIG. 1.
Figure 10:
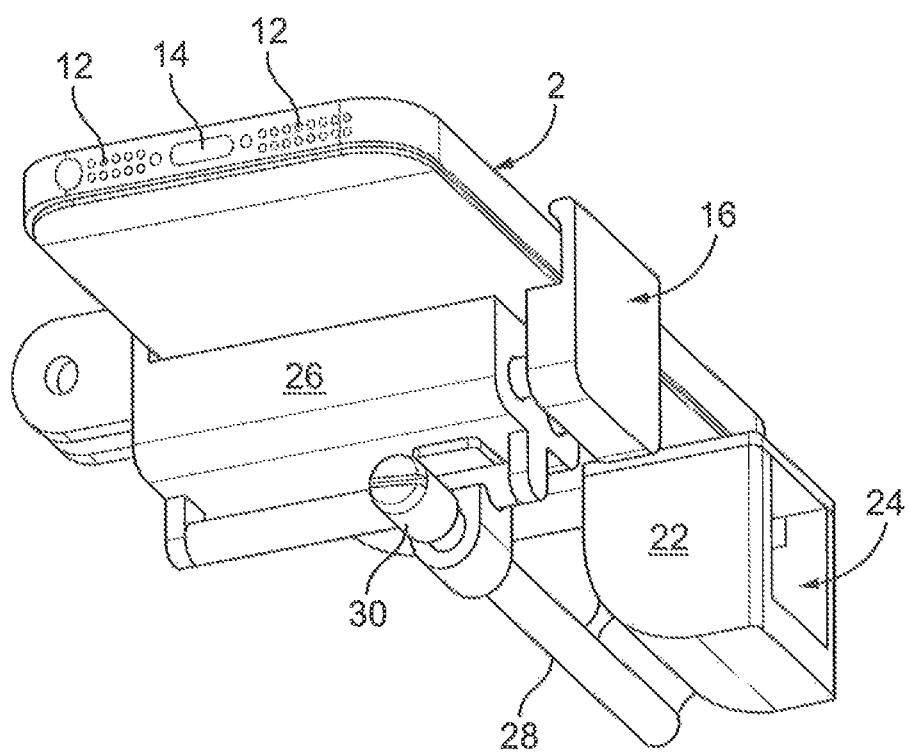
FIG. 10 is a bottom perspective view of a video device secured to a mounting kit in accordance with the present Internet-based virtual travel system of FIG. 1.
Figure 11:
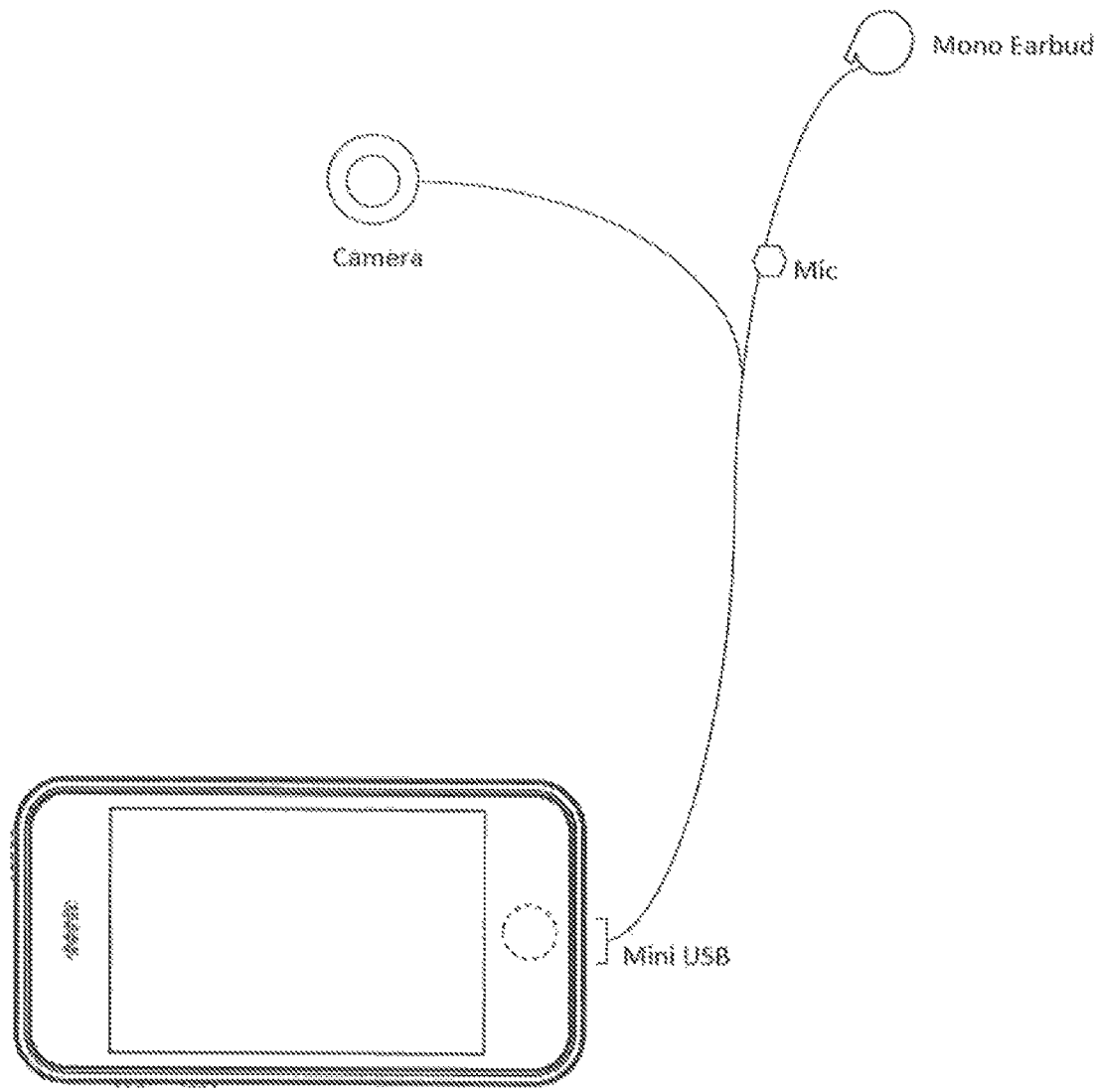
FIG. 11 is a wearable clip-on video camera with a mono earbud and microphone in accordance with the present Internet-based virtual travel system of FIG. 1.

Turning now to FIGS. 4-11, an adjustable cellular phone chest mount kit 16 with a J-connector 18 for connection to a chest shoulder harness 20, a periscope 22 including a prism 24 therein permits the virtual travel guide 108 to effectively live stream video using a smartphone 2 while the hands are free for other tasks including operation of the smartphone controls such as a home button 10 that takes the traveler guide to the home screen for accessibility to apps and other features of the smartphone 2. As shown in FIG. 4, the smartphone 2 includes a touchscreen or graphical user interface 4, a microphone 6, a front camera 8, a back camera (not shown) to focus on the prism 24 in the periscope 22 to view the surroundings, speakers 12 and a USB connection 14 to download files and charge the smartphone. For example, the smartphone mount kit 16 is compatible with any type of chest mount harness 20, including a GoPro chest mount sold by GoPro, Inc. The smartphone mounting kit 16 connects to the GoPro chest mount using a J Hook connector 18 or the like. The smartphone mounting kit 16 includes an adjustable spring clamp 26 that is adjustable to fit any size smartphone 2. The smartphone 2 is placed flat or horizontal to the ground in the mounting kit 16 with the touch screen 4 facing upwards. This orientation of the smartphone 2 makes the touch screen 4 on the typical smartphone 2 accessible to the user or virtual traveler guide 108 for starting/stopping the streaming video, viewing comments, seeing maps, getting directions, initiating virtual shopping, communicating directly with the virtual traveler 102 etc. The clamp 26 to secure the smartphone 2 to the mounting kit 16 connects in such a way that it does not cover the camera lens on the back of any type of smartphone 2. The smartphone mounting kit 16 also contains the adjustable periscope 22 that is attached to one of the spring clamping mechanism components that is an adjustable rod 28 with a slotted knurl 30 on the end opposite from the periscope 22 to adjust the periscope to the location of the back camera lens with the periscope prism 24. The periscope 22 consists of the prism 24 and is used to redirect the back camera (not shown) which by default has the camera lens facing downwards toward the ground due to the phone lying flat on the chest mount kit 16 so that the camera can capture what is ahead or in front of the traveler guide. As stated above, the periscope housing 22 is connected to the clamp 26 via the rod 28 and the slotted knurl 30 is adjustable such that it can be placed in a way that can connect to any phone's camera lens regardless of its location on the back of the smartphone 2. The periscope 24 sits on top of the smartphone camera lens using round magnets (not shown) that are stuck around the smartphone camera lens and at the bottom of the periscope housing 22. This creates a connection that is able fit all smartphone lens sizes Variations of the adjustable smartphone chest mount kit 16 with the adjustable periscope 22 includes: a) the clamp 26 using one spring instead of two as shown in FIG. 8; b) the angle of the smartphone being adjustable in the mount kit 16 such to make the touchscreen 4 easier to access; c) the front camera 8 through the touchscreen 4 is used to capture the face of the virtual traveler guide 108 whereas the back camera (not shown) is used to capture the real-time view of a destination point; d) The smartphone mounting kit 16 also contains a 2 axis or 3 axis gyroscopes to further stabilize the video: e) different size prisms or a truncated prism is used instead of the default 20*20*20 prism 24 depending on the desired view; f) a wide angle lens is added to the prism 24 to further increase the range of view of the smartphone camera; g) multiple prisms are connected to the mounting kit in a way to capture a 180 degree or 360 degree view making it an even larger range of view; h) a modified clamp provides adjustable height options so that the smartphone 2 is able to be seated either higher or lower on the chest of the traveler guide 108; and i) further, the smartphone mounting kit 16 contains a holder to store related items such as an extra battery pack for the smartphone, an additional wired or wireless microphone to amplify sound, and/or a modem or mobile WiFi hotspot for the smartphone to connect to a wired or wireless Internet connection.

A mobile app allows virtual travel guides to live stream video using their smartphones. The App may also contain software to increase the speed and reliability of the Internet connection in order to provide a higher quality and more stable live streaming video. This software will take the data packets of the video stream, pass them across multiple Internet connections simultaneously, and connect them back together in the cloud to provide an accurate video stream. By spreading the data packets across multiple channels (networks) the speed of the connection is significantly increased as it takes less time for the packets to reach their destination when compared to a single channel. This also provides increased reliability such that if one channel becomes slow or fails, the other channel(s) take over. The software contains the ability to a) connect the smartphone to multiple wireless local area networks or other networks accessible to the smartphone such as the cellular network through the smartphone modem/SIM as well as another network through a WiFi connection or even a wired modem or another connection via Bluetooth; the ability to b) intelligently assign the data packets by passing the data packets through different channels simultaneously along with meta data that identifies information about those packets such as their sequence in the stream; the ability to c) continuously assess the speed, latency and other information of each network such that it can optimize the assigning of packets and start/stop using networks as needed to enhance the speed, reliability, and quality of the video stream; the ability to d) connect the data packets coming in from multiple channels/networks into a combined data/video stream in the correct sequence based on the meta data. The software has the ability to pass only unique data packets across multiple networks or even to pass duplicate data packets across multiple networks, and even set thresholds of how many or what percentage of duplicate packets should be passed through different networks for redundancy purposes, and do so automatically based on the optimization algorithms, or manually based on end user input. The software is agnostic in regards to whether the different networks that are being combined are either the same carrier/provider or different carriers/providers.

Variations of the software include: a) the ability for the software to also work on wearable devices (in addition to smartphones); b) the ability to perform image stabilization based on the smartphone or the wearable device mounting kits with inbuilt gyroscope sensor or an external gyroscope on the smartphone mount to make the stream less shaky; perform image correction in the event of missed data packet/s by using the data packet/s before and/or after the missing data packet/s to help fill in the gaps in the live streaming video.

By default most smartphones have a cellular modem as well as WiFi. For software bonding purposes this provides access to two different networks/channels to combine or bond. However, in some cases where the network is poor and/or the quality of the stream needs to be higher there may be a need to combine more than two networks. For such cases having a mobile Wi-Fi hotspot that contains two or more modems would be useful. Although the mobile Wi-Fi hotspot has multiple modems it is a) able to use these modems simultaneously; b) connect to a smartphone or wearable device via the smartphone/wearable device one WiFi connection, but provide access to all the modems of the mobile Wi-Fi hotspot. One way to do this is to use a Raspberry Pi or other such processor and convert it into a router, such that it can be connected to via single access point through its WiFi. The Raspberry Pi or other processor would then connected to multiple cellular modems via USB and/or Ethernet (and/or even additional WiFi and/or Bluetooth connections). Software written for the processor intelligently connects to the multiple modems simultaneously and collects data such as speed and latency which it would then communicate to the software app on the phone or wearable device (via the Wi-Fi connection) to use for effective channel bonding or combining purposes.

Variations of this device include the use of virtual SIMs or SIM cards that can connect to different network carriers/providers from the same SIM card. The advantage of this is that the same device can be compatible across the globe as it could remotely be setup to access the local carrier network instead of the roaming network (giving it a stronger and more cost effective network). Using such virtual SIMs would also be useful in the event of poor network areas where one carrier/provider may be have better coverage than the other provider and therefore could be selected for the live stream in that particular area (without having to physically change the modem or carry along different modems).

All the live streams of video (virtual travel sessions) are automatically recorded for later viewing by the end user 102. In these recordings not just the live video is recorded, but also all of the interactions, comments, questions, suggestions from both viewers 102 and guides 108 are recorded along with corresponding time stamps. During the video playback of a recording, there is the ability to play back not just the recorded video but also all the interactions as the interactions happened during the recorded video (the recordings and interactions are played in synch). These recorded interactions are visualized in various ways. One way is a vertical feedback that plays alongside the video player (overlayed on the video or placed next to the video). These recorded interactions are visualized in ways that allow viewers to skip to particular points in the video based on the interaction, whether it be some sort of list view, a timeline view, or even a word cloud type view, where viewers can select the interaction they want to jump to and the video would automatically play back from the point of that interaction.

In certain scenarios a single virtual travel guide 108 may be showing around several virtual travelers 102. Aside from multiple virtual traveler viewers 102 having the ability to interact with the traveler guides 108 via text, voice or video based interactions, sometimes viewers 102 are given a poll—in which the viewer(s) 102 jointly are able to vote on a particular topic and the majority vote wins. For example imagine a point at which the guide 108 can either turn left or right—at such a point the guide may choose to initiate a poll that then allows the viewers to vote on the options (within a certain time limit). The winning vote is then accommodated. These points at which polls can occur can be planned in advance and set up by the guide 108 to automatically appear during the tour based on a particular GPS location or initiated manually by the guide 108 at any time during the live tour using the mobile app.

Further in accordance with the present invention, groups of recorded videos are either combined or played back in a way that provides personalization options to viewers 102. For example, if in the video playback a guide 108 is at a point in which there are two options to choose from (like left or right, or beach or city) viewers 102 are presented with the ability to select one of the options (even though it is a recorded video) and based on their selection the next appropriate video would play. Videos recorded by one or more guides 108, in one or more locations, are grouped together (across guides 108, locations, etc.) for such a personalized experience, giving the viewer(s) 102 more personalization than a typical recorded video (but not as much as a live video in which they are part of the experience and can control it in real-time based on their interactions).

Recorded videos are tagged with several types of attributes, either automatically based on image recognition techniques or manually by people (either internally by the company, its employees, independent contractors or externally by users) creating a vast amount of metadata about the recorded videos. Each piece of data is tied to a point in time within the recorded video. A system to create such metadata easily is provided to users who simply select a tag (or create one if one does not exist) during a point in the video either in real-time or during recorded playback (with or without pausing the video) and with or without the option of selecting or highlighting an area of the video. The system automatically stores all this data along with the appropriate timestamp (i.e. the point in time and optionally even the time range in the video where such a tag occurs) in the database in an organized and optimized fashion making it easily searchable and connected to metadata from other videos. As a result viewers 102 are provided with the ability to search for and play recorded videos based on particular tags or attributes, whether it is objects (bridges, cars, mountains, etc.), living beings (people, animals, etc.), locations (countries, states, regions, cities, neighborhoods, streets, etc.), themes (adventure, nightlife, culinary, etc.), moods (fun, inspirational, etc.), views (eye level, chest level, aerial view, etc.), types of camera's (action camera, smartphone camera, drone camera, etc.) and more. The videos are capable of being played back to back based on the tag, starting from or showing only the part of the videos that contains the selected tag (based on the timestamps), and are played in a particular order (location based, date based, popularity based, itinerary based, etc.) or randomly, and may or may not be filtered (based on location or other criteria and attributes). The tags or attributes are searched or represented visually for users 102 to select and users or viewers 102 are able to select one or more tags to play back videos. Users 102 may share these videos grouped based on tags—either the entire group or snippets that are like the best. The recorded videos may or may not be generated from the virtual travel system as this technology is capable of being applied to recorded videos created as part of the platform as well as to other videos created outside the platform.

In addition to travel exploration and inspiration for the viewer(s) 102, the virtual travel system 106 is available for educational purposes (providing students in a classroom an interactive & personalized audio-visual tour to complement their reading or discussions in a classroom), virtual shopping (helping people find and shop for items anywhere in the world that are not generally available online, or to shop for items from abroad in a highly visual way without having to make a physical trip), entertainment (as a new form of live, interactive, and personalized TV whether it be a travel tour, a reality show, or crowd sourced news), marketing (providing prospective travelers 102 a preview of what it is like to visit a destination or location), research (studying how people find, perceive and use products), cost savings (campus tours for prospective out-of-state and international students), conferences or events (private or public live, mobile, and interactive tours of conferences or events for those participants that are unable to make it), sales (personalized sales tours of a property or venue to potential buyers or renters or event hosts), fundraising (non-profits visually showing the problem and what efforts are being undertaken to solve the problem in an effort to raise awareness and donations), location scouting (finding the right locations for a film), construction (getting updates on construction progress), field service (helping on-site technicians solve problems when additional guidance or assistance is required), social good (giving vicarious tours to users or viewers 102 who are either physically or financially unable to afford a trip—whether the users or viewers 102 are children in a hospital, seniors in an old age home, physically disabled people, financially underprivileged people), and many more.

Sometimes the smartphone camera is not the ideal camera for live video streaming, whether it be because of the quality of the camera, the range of the lens or the handheld nature of the smart phone. An adjustable phone chest mounting kit 16 with the adjustable periscope 22 solves most of the problems and makes live video streaming a hands free experience, but live video streaming is still bound to using the smartphone camera and the task of mounting a smartphone to the chest sometimes may not be convenient. Some traveler guides 108 may prefer alternative methods to stream live video. This is where having a flexible external camera that is still connected to a smartphone for the cellular connection to the Internet but is easily clipped onto a person is useful. The wearable clip-on video camera with mono earbud and mic is a solution to this problem wherein a small but high quality and wide angled lens camera is enclosed into a smart casing compatible with multiple mounts that allows it to be easily mounted in various ways—including being clipped-on to eyewear or a hat. The camera connects to a smartphone using a wired connection via micro USB, lightning connector, phone jack or other inputs of the smartphone. The wire is split in a way that one wire goes to the camera whereas the other wire contains a microphone as well as a mono earbud. The split wire limits the amount of wires and the wire is placed in a non-obstructive position connecting to the smartphone in the traveler guides 108 hands or pocket. The camera is generally very small because the camera lacks a battery and uses power from the smartphone 2.

Variations of this device include; a) a multiple mic variation where the camera contains an in-built microphone and that plus the microphone on the wire where the built-in camera microphone is used to capture more of the environment whereas the wire mic is meant to capture more of the user voice and both are synchronized; b) a multiple camera variation in which additional cameras (without the split wire with mic & earbud but with or without the inbuilt camera mic) are used and mounted in a way that captures multiple angles of the guide 108 (e.g. the front, back, right side and left side) and are provided to viewers 102 as multiple camera angles or stitched together to create one all-around view and the cameras are connected to the phone using a hub that takes the input of the different camera wires and gives one output to the phone; c) a gyroscope sensor is added to the camera such that the phone software can leverage it for image stabilization purposes; d) a wireless version of the device uses Wi-Fi, Bluetooth, or other wireless protocols to pass the camera video stream to the smartphone along with an built-in battery to power the device and a separate wired mono earbud with mic or wireless Bluetooth headset; e) a necklace mount and a shoulder mount for the device is also possible; f) an integrated version of the device is wired by default into eyewear or a hat but is also capable of a wireless option; g) an integrated version of the device incorporates a camera into a Bluetooth headset where the audio goes from the headset via Bluetooth while the camera video goes to the smartphone via Wi-Fi or another wireless protocol.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the invention.

Having thus described the invention, I claim:

1. A system comprising:
   a communicator device for an entity, the communicator device comprising a graphical user interface, and a first circuitry for audio and communication connected to the Internet through a first network, the first network being different from the Internet;
   a video device for a user, the video device comprising a camera, a second circuitry for audio and communication connected to the Internet through a second network, the second network being different from the Internet and the first network, wherein the video device is configured to be horizontally mounted by adjustable members of a mounting kit, wherein the camera is configured to face downwardly toward ground for focusing the camera on a prism within the mounting kit that is in-line with a lens of the camera to provide a forward looking view from a perspective of the user, wherein the mounting kit is a necklace mount configured to be bound around a neck of the user, wherein the necklace mount is configured to secure the camera such that hands of the user are free from holding the video device; and
   a third circuitry connecting the communicator device to the video device through the first network and the second network, respectively, the third circuitry communicating a data file from the communicator device to the video device to enable the user to find, perceive and use one or more products of interest to the entity, the third circuitry communicating from the video device to the communicator device a video characterizing interactions and feedback of the user with the one or more products during the finding, perceiving and using of the one or more products,
   wherein the third circuitry is configured to improve quality and stability of the video by:
      separating data packets within the video;
      assigning the data packets to a plurality of channels associated with at least one of the first network or the second network, wherein the separated data packets are assigned to the plurality of channels based on a continuous assessment of latency of data transmission within one or more of the plurality of channels;
      transmitting, over the plurality of channels, the data packets with meta data indicating information regarding sequence of each packet within the video; and
      combining the transmitted data packets from different channels of the plurality of channels based on the meta data.

2. The system of claim 1, wherein the third circuitry is configured to:
   receive the data file from the communicator device;
   transmit the data file to the video device;
   receive the video from the video device;
   analyze, from the video, interactions and feedback of the user while the user finds, perceives and uses the one or more products to generate an analysis specific to the user;
   generate, based on the analysis, personalized suggestions for the entity; and
   transmit the personalized suggestions to the communicator device.

3. The system of claim 1, wherein:
   the third circuitry generates a real-time interactive visualization that indicates current and past movements of the user while finding, perceiving and using the one or more products; and
   the third circuitry generates personalized suggestions for the entity based on the real-time interactive visualization, the third circuitry including the personalized suggestions for the entity in the video.

4. The system of claim 1, wherein the third circuitry enables the video device to provide a real-time ability to the user to make purchases of the one or more products via the video device.

5. The system of claim 1, wherein:
   the third circuitry enables the communicator device to allow the entity to pay for participation of the user for the finding, the perceiving or the using of the one or more products,
   the third circuitry is configured to permit the entity to pay via multiple options comprising cash, one or more credit cards, one or more bank transfers, one or more intermediaries, one or more payment systems, one or more mobile payments, one or more email payments, and one or more virtual currencies.

6. The system of claim 1, wherein the third circuitry generates video images, text, interactive ads, real-time location aware promotions, and product placements that are incorporated into the video.

7. The system of claim 1, wherein:
   the third circuitry comprises a database that collects and stores data of the user as the user finds, perceives, and uses the one or more products while using the video device, the data comprising characteristics, interests, preferences, demographics, psychographics, virtual exploration sessions, locations, mapping, interactions, selections, intent, payments, purchases, advertisements, promotions, product placements, one or more videos, audio, images, text messaging, activities, and movements of the user; and the third circuitry generating personalized suggestions for the entity based on the collected and stored data.

8. The system of claim 1, wherein the third circuitry comprises a server that communicates the data file stored in a database over the Internet through the second network to the video device.

9. The system of claim 1, wherein the video device is a smart device capable of wirelessly transmitting the video through the second network to the communicator device, wherein the video is transmitted to the communicator device via the third circuitry and further through the first network.

10. The system of claim 1, wherein the communicator device is a smart device configured to:
transmit the data file through the first network to the video device, wherein the data file is transmitted via the third circuitry and further through the second network; and
receive, via the third circuitry and in response to the transmission of the data file, the video from the video device.

11. The system of claim 1, wherein the communicator device, the video device and the third circuitry communicate with each other through wireless communication protocols through the first network, the second network, and the Internet, the wireless communication protocols comprising WiFI, Bluetooth and Cellular phone protocols.

12. The system of claim 1, wherein the video device comprises a three-axis gyroscope sensor that stabilizes the video.

13. The system of claim 1, wherein the third circuitry is configured to perform image correction within the video in response to missing data packets in the video, the image correction being performed by using the data packets before and/or after the missing data packets.

14. The system of claim 1, wherein the third circuitry is configured to generate one or more personalized suggestions for the entity in real time based on one or more preferences of the entity comprising an image quality of the video.

15. The system of claim 1, wherein:
the data file is one or more of a text, audio, photo or another video that are transmitted via live streaming or a prerecorded format; and
the video is one of a live streaming video or a prerecorded video.

16. The system of claim 1, wherein:
the video device comprises a smartphone and a cord; and
the cord is attached to a mono earbud, a microphone, and the camera that are external to the smartphone.

17. A system comprising:
a communicator device for an entity comprising a graphical user interface, and a first circuitry connected to the Internet through a first network;
a video device for a user comprising a camera, and a second circuitry connected to the Internet through a second network;
a third circuitry connecting the communicator device to the video device through the first and second networks, respectively, the third circuitry communicating a data file from the communicator device to the video device to enable the user to find, perceive, and use one or more products of interest to the entity, the third circuitry communicating from the video device to the communicator device a video characterizing interactions and feedback of the user with the one or more products during the finding, perceiving and using of the one or more products, at least one of the data file or the video comprising a live stream or a prerecorded video with an audio or a text component, wherein the third circuitry is configured to perform image correction within at least one of the data file or the video in response to missing data packets in at least one of the data file or the video, the image correction being performed by using the data packets before and/or after the missing data packets; and
a mounting kit comprising adjustable members for horizontally mounting the video device, wherein the camera is configured to face downwardly toward ground for focusing the camera on a prism within the mounting kit that is in-line with a lens of the camera to provide a forward looking view from a perspective of the user, wherein the mounting kit is a necklace mount configured to be bound around a neck of the user, wherein the necklace mount is configured to secure the camera such that hands of the user are free from holding the video device and such that the video is stable.

18. The system of claim 17, wherein the third circuitry generates, based on the finding, perceiving and using by the user, inferences about a manner in which the user finds, perceives and uses the one or more products.

* * * * *

UNITED STATES PATENT AND TRADEMARK OFFICE
CERTIFICATE OF CORRECTION

| | | |
|---|---|---|
| PATENT NO. | : 10,933,209 B2 | Page 1 of 1 |
| APPLICATION NO. | : 14/530441 | |
| DATED | : March 2, 2021 | |
| INVENTOR(S) | : Nihal Advani | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 919 days.

Signed and Sealed this
Sixth Day of December, 2022

Katherine Kelly Vidal
*Director of the United States Patent and Trademark Office*